United States Patent
Kim et al.

(10) Patent No.: US 11,360,972 B2
(45) Date of Patent: Jun. 14, 2022

(54) DATA ANONYMIZATION IN DATABASE MANAGEMENT SYSTEMS

(71) Applicant: SAP SE, Walldorf (DE)

(72) Inventors: Taehun Kim, Seoul (KR); Taehyung Lee, Seoul (KR); Stephan Kessler, Linkenheim-Hochstetten (DE); Kaweh Amoi-Taleghani, Karlsruhe (DE); Thomas Seufert, Oftersheim (DE); Jens Hoff, Deidesheim (DE); Kai Morich, Hockenheim (DE); Jin Uk Bae, Seoul (KR); Chuho Chang, Seoul (KR)

(73) Assignee: SAP SE, Walldorf (DE)

( * ) Notice: Subject to any disclaimer, the term of this patent is extended or adjusted under 35 U.S.C. 154(b) by 669 days.

(21) Appl. No.: 16/365,903

(22) Filed: Mar. 27, 2019

(65) Prior Publication Data
US 2020/0311296 A1    Oct. 1, 2020

(51) Int. Cl.
| | |
|---|---|
| *G06F 16/00* | (2019.01) |
| *G06F 16/242* | (2019.01) |
| *G06F 21/62* | (2013.01) |
| *G06F 16/248* | (2019.01) |
| *G06F 16/2453* | (2019.01) |

(52) U.S. Cl.
CPC ........ *G06F 16/2445* (2019.01); *G06F 16/248* (2019.01); *G06F 16/24535* (2019.01); *G06F 21/6227* (2013.01); *G06F 21/6254* (2013.01)

(58) Field of Classification Search
CPC .......... G06F 16/2445; G06F 16/24535; G06F 16/248; G06F 21/6227; G06F 21/6254

USPC .................................................. 707/600–899
See application file for complete search history.

(56) References Cited

U.S. PATENT DOCUMENTS

| | | | |
|---|---|---|---|
| 8,533,732 B2 | 9/2013 | Morich et al. | |
| 8,676,959 B2 | 3/2014 | Morich et al. | |
| 9,031,976 B2 | 5/2015 | Seufert et al. | |
| 9,152,626 B2 | 10/2015 | Seufert et al. | |
| 9,722,973 B1 * | 8/2017 | Kothari | H04L 63/0435 |
| 9,910,902 B1 * | 3/2018 | Kramer | G06Q 50/01 |

(Continued)

OTHER PUBLICATIONS

U.S. Appl. No. 15/979,032, filed May 14, 2018, Kessler et al.

(Continued)

*Primary Examiner* — Michelle N Owyang
(74) *Attorney, Agent, or Firm* — Fish & Richardson P.C.

(57) ABSTRACT

Implementations of the present disclosure include receiving a view command for creating a view to display anonymized data in response to one or more queries, the view command including a view name, a table, a set of columns of the table, an anonymization type, a set of static parameters, and, for a sub-set of columns of the table, one or more sets of column-specific parameters, each set of column-specific parameters being specific to anonymization of data of a respective column of the table included in the sub-set of columns, storing the view command within the database system, and receiving a query referencing the view, and in response, providing a data set including data from each column in the sub-set of columns, receiving an anonymized data set including anonymized data that is generated from the data set using the anonymization type, the static parameters, and the sets of column-specific parameters.

20 Claims, 5 Drawing Sheets

(56) References Cited

U.S. PATENT DOCUMENTS

| | | |
|---|---|---|
| 10,133,778 B2 | 11/2018 | Lee et al. |
| 2014/0317756 A1* | 10/2014 | Takahashi ........... G06F 21/6254 |
| | | 726/26 |
| 2015/0007249 A1* | 1/2015 | Bezzi ................. G06F 21/6227 |
| | | 726/1 |
| 2015/0324382 A1 | 11/2015 | Seufert et al. |
| 2017/0147639 A1 | 5/2017 | Lee et al. |
| 2017/0147645 A1 | 5/2017 | Song et al. |
| 2017/0147646 A1 | 5/2017 | Lee et al. |
| 2017/0147671 A1 | 5/2017 | Bensberg et al. |
| 2017/0272472 A1* | 9/2017 | Adhar ................... G06F 21/316 |
| 2018/0293276 A1 | 10/2018 | Bae et al. |
| 2020/0278934 A1* | 9/2020 | Hillier ................. G06F 21/6254 |

OTHER PUBLICATIONS

U.S. Appl. No. 15/979,067, filed May 14, 2018, Kessler et al.
ARX.Deidentifier.org [online], "ARX Data Anonymization Tool," ARX Data Anonymization Tool Product Overview, 2019, [retrieved on Mar. 26, 2019], retrieved from: URL<https://arx.deidentifier.org/>, 2 pages.
SAP.com [online], "Real-Time Data Anonymization with SAP HANA," SAP HANA Overview, [retrieved on Mar. 26, 2019], retrieved from: URL<https://www.sap.com/cmp/dg/crm-xt17-ddm-data-anony/index.html>, 4 pages.

* cited by examiner

DATA ANONYMIZATION IN DATABASE MANAGEMENT SYSTEMS

BACKGROUND

Sensitive personal data is continuously collected and stored in one or more database systems. For example, in an enterprise setting, a database system may store human resources data regarding employees (e.g., name, gender, educational level, address, salary, role). As another example, in a healthcare setting, a database system may store patient information (e.g., name, gender, address, illnesses, treatments). In some examples, an entity (e.g., enterprise, user) that collects and stores such data can be referred to as a data controller. In some instances, the data controller may make data available for analysis. For example, a data scientist may review data stored in a database system to analyze the data and extract statistical meaning therefrom. However, privacy concerns and privacy regulations (e.g., the General Data Protection Regulation (GDPR)) prevent the usage and/or sharing of sensitive personal data. Consequently, anyone accessing a database system that stores sensitive personal data (even if accessing legally and with authorization) can be seen as an adversary, from which data should be protected without exception.

Data anonymization can be used to prevent leakage of data to adversaries. Data anonymization, however, can have limitations. For example, data that is to be analyzed is typically anonymized then exported from the database system to an external application (e.g., as a spreadsheet, or over Java Database Connectivity (JDBC) connection). This requires additional memory, processors, and communication bandwidth. Further, the entirety of the data that is to be analyzed is exported, and any subsequent updates to the data are either not included in the analysis, or another full anonymization and export process needs to be executed.

SUMMARY

Implementations of the present disclosure include computer-implemented methods for enabling access to anonymized data within a database system. More particularly, implementations of the present disclosure are directed to providing a view to data stored within a database system, at least a portion of the view including anonymized data.

In some implementations, actions include receiving, by a database system, a view command for creating a view to display anonymized data in response to one or more queries to the database system, the view command including a view name, a table, a set of columns of the table, an anonymization type, a set of static parameters, and, for a sub-set of columns of the table, one or more sets of column-specific parameters, each set of column-specific parameters being specific to anonymization of data of a respective column of the table included in the sub-set of columns, storing, by the database system, the view command within the database system, and receiving, by the database system, a query including a select command from the view, and in response: providing a data set including data from each column in the sub-set of columns, receiving an anonymized data set including anonymized data that is generated from the data set using the anonymization type, the static parameters, and the sets of column-specific parameters, and providing the view as a virtual table that is at least partially populated with the anonymized data set in respective columns for display to a user that submitted the query. Other implementations include corresponding systems, apparatus, and computer programs, configured to perform the actions of the methods, encoded on computer storage devices.

These and other implementations may each optionally include one or more of the following features: the virtual table is at least partially populated with non-anonymized data from at least one column of the table, the at least one column being absent from the sub-set of columns of the table; at least one set of column-specific parameters defines a hierarchy for generalizing data of a respective column during anonymization; at least one set of column-specific parameters defines a suppression symbol for replacing a data value for anonymization; the anonymization type includes one of k-Anonymity and l-Diversity and the static parameters include a minimum group size and a loss; the anonymization type includes one of k-Anonymity, l-Diversity, and Differential Privacy, and the static parameters define a data change strategy; and the anonymization type comprises one of k-Anonymity, l-Diversity, and Differential Privacy, and the sets of column-specific parameters identify a column of the sub-set of columns as a sequence column.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
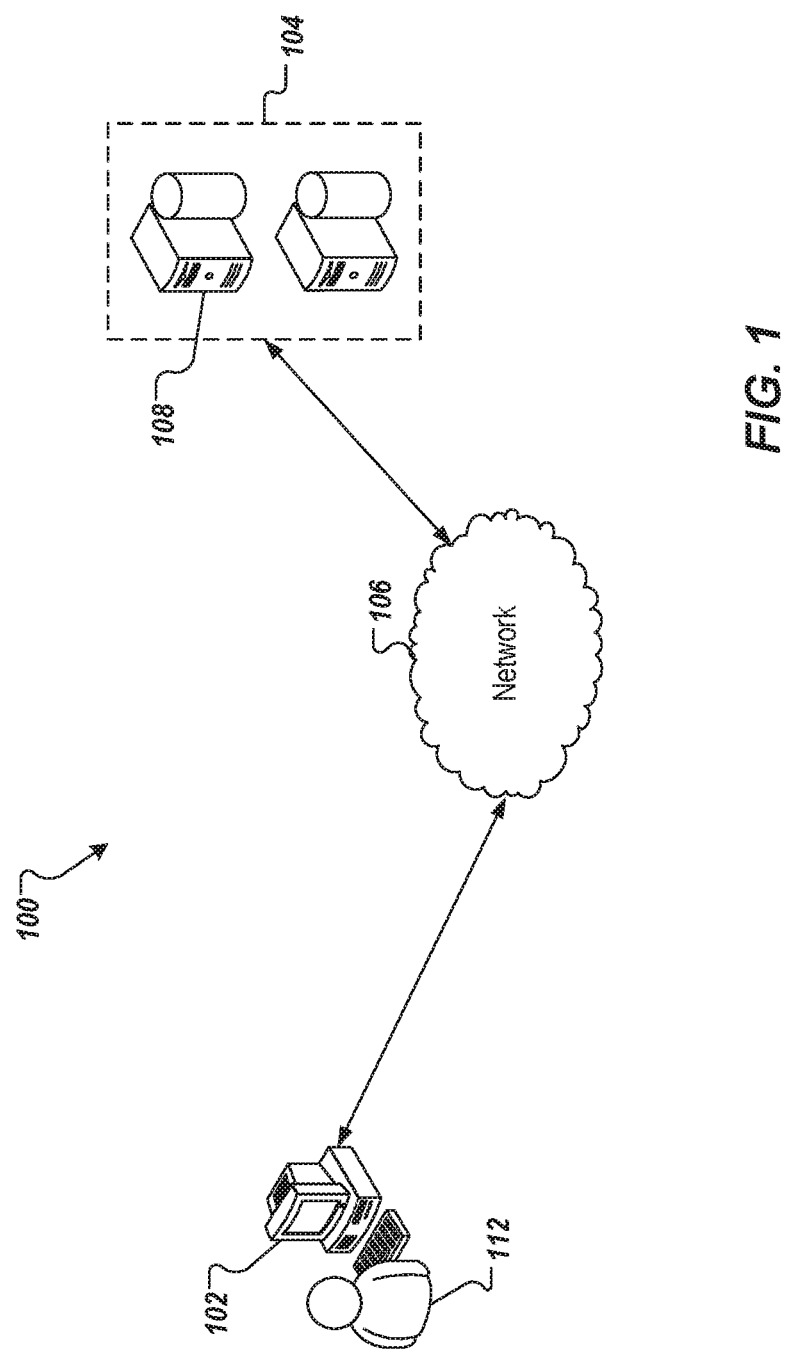
FIG. 1 depicts an example environment that can be used to execute implementations of the present disclosure.

Implementations of the present disclosure include computer-implemented methods for enabling access to anonymized data within a database system. More particularly, implementations of the present disclosure are directed to providing a view to data stored within a database system, at least a portion of the view representing anonymized data. In some implementations, actions include receiving, by a database system, a view command for creating a view to display anonymized data in response to one or more queries to the database system, the view command including a view name, a table, a set of columns of the table, an anonymization type, a set of static parameters, and, for a sub-set of columns of the table, one or more sets of column-specific parameters, each set of column-specific parameters being specific to anonymization of data of a respective column of the table included in the sub-set of columns, storing, by the database system, the view command within the database system, and receiving, by the database system, a query including a select command from the view, and in response: providing a data set including data from each column in the sub-set of columns, receiving an anonymized data set including anonymized data that is generated from the data set using the anonymization type, the static parameters, and the sets of column-specific parameters, and providing the view as a virtual table that is at least partially populated with the anonymized data set in respective columns for display to a user that submitted the query.

Implementations of the present disclosure are described in further detail herein with reference to an example database system. The example database system includes an in-memory database system. An example in-memory database system includes SAP HANA provided by SAP SE of Walldorf, Germany. In general, an in-memory database system uses main memory for data storage. Main memory may include one or more types of memory (e.g., DRAM, NVM) that communicates with one or more processors (e.g., CPU(s)) over a memory bus. An in-memory database system may be contrasted with database management systems that employ a disk storage mechanism. In some examples, in-memory database systems may be faster than disk storage databases, because internal optimization algorithms may be simpler and execute fewer instructions. In some examples, accessing data in an in-memory database system may reduce or eliminate seek time when querying the data, providing faster and more predictable performance than disk-storage databases. Implementations of the present disclosure are described in further detail with reference to an example query language. The example query language includes the structured query language (SQL) as the language that is used to query the database system. It is contemplated, however, that implementations of the present disclosure can be realized with any appropriate database system and/or query language.

To provide further context for implementations of the present disclosure, and as introduced above, sensitive personal data is continuously collected and stored in one or more database systems. For example, in an enterprise setting, a database system may store human resources data regarding employees (e.g., name, gender, educational level, address, salary, role). As another example, in a healthcare setting, a database system may store patient information (e.g., name, gender, address, illnesses, treatments). In some examples, an entity (e.g., enterprise, user) that collects and stores such data can be referred to as a data controller. In some instances, the data controller may make data available for analysis. For example, a data scientist may review data stored in a database system to analyze the data and extract statistical meaning therefrom. However, privacy concerns and privacy regulations (e.g., the General Data Protection Regulation (GDPR)) prevent the usage and/or sharing of sensitive personal data. Consequently, anyone accessing a database system that stores sensitive personal data (even if accessing legally and with authorization) can be seen as an adversary, from which sensitive data should be protected without exception.

Data anonymization can be used to prevent leakage of data to adversaries. Data anonymization, however, can have limitations. For example, data that is to be analyzed is typically anonymized then exported from the database system to an external application (e.g., as a spreadsheet, or over Java Database Connectivity (JDBC) connection). This requires additional memory, processors, and communication bandwidth. For example, the data is not only stored in the database system, but export of the data results in a copy of the data, or at least a portion thereof, being stored outside of the database system. Further, the entirety of the data that is to be analyzed is exported, and any subsequent updates to the data are either not included in the analysis, or another full anonymization and export process needs to be executed.

In view of this, implementations of the present disclosure provide a query language process to enable privacy-aware data processing to provide data anonymization, and a view to data stored within a database system, at least a portion of the view representing anonymized data. In database systems, a view can define a result set of a stored query on data stored within the database system. A view can be described as a pre-established query command that is stored in the database system. Because the view is a result set, the view can be considered a virtual table that is dynamically populated from data in the database system in response to a request to access the view. A view can be refreshed to reflect changes applied to the data in a relevant underlying table that have occurred since the view was initially invoked. In short, a view represents a subset of the data contained in one or more tables stored in the database. In accordance with implementations of the present disclosure, a view represents anonymized data (e.g., data of a table that is anonymized to provide the anonymized data) and data (e.g., non-anonymized).

As described in further detail herein, implementations of the present disclosure provide query language commands that can be used to define one or more views and analyze source data stored within a database system for data anonymization, each view providing anonymized data. The views enable analysis to be performed on the data, including anonymized data, without having to export from the database system. Implementations of the present disclosure also provide system views to display information about data anonymization. As described herein, implementations of the present disclosure achieve multiple technical advantages. Example advantages include, without limitation, providing access to anonymized data in a resource-efficient manner, protecting sensitive data from an adversary, providing up-to-date data to an adversary, enabling an adversary to use functions of the database system to conduct analysis without leakage of sensitive data, and obviating exportation of data, which obviates processing and memory required to export and store copied data.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and in view of the example use case, the server system 104 can host an in-memory database system (e.g., SAP HANA). In some implementations, the user 112 queries the in-memory database system to receive a query result. In some implementations, the query result is provided in a view, where at least a portion of the view represents anonymized data, as described in further detail herein.

As introduced above, implementations of the present disclosure enable an adversary to access and execute analysis on data stored within a database system including sensitive data. More particularly, implementations of the present disclosure enable sensitive data to be anonymized within the database system, and provided with non-anonymized data in one or more views. In some implementations, a data controller, also referred to as a data controller (e.g., a person or entity responsible for the sensitive data) anonymizes sensitive data using query language commands (e.g., SQL commands). In some implementations, the data controller defines an view and initiates analysis of the data for anonymization. The data controller sets anonymization parameters and their implications for privacy. Once finalized, the data controller can grant access to the anonymized view for others (e.g., data scientists), who can be referred to as adversaries.

Implementations of the present disclosure support multiple types of anonymization, which are built into the database system. Example types of anonymization include, without limitation, k-Anonymity, l-Diversity, and Differential Privacy. It is contemplated, however, that implementations of the present disclosure can be realized with any appropriate type of anonymization. In some examples, data anonymization functionality for respective types of anonymization is already provided for within the database system (e.g., as a custom calculation engine node). That is, the database system includes one or more computer-executable programs (e.g., anonymization calculation engines) that receive data (non-anonymized data) as input, as well as one or more parameters to perform the anonymization, process the data to provide anonymized data, and provide the anonymized data as output (e.g., to populate a view). However, and in accordance with implementations of the present disclosure, data anonymization is integrated it into the query language stack (SQL stack) to provide resource optimizations and enable anonymization (e.g., also for applications that do not use the calculation engine).

Figure 2:
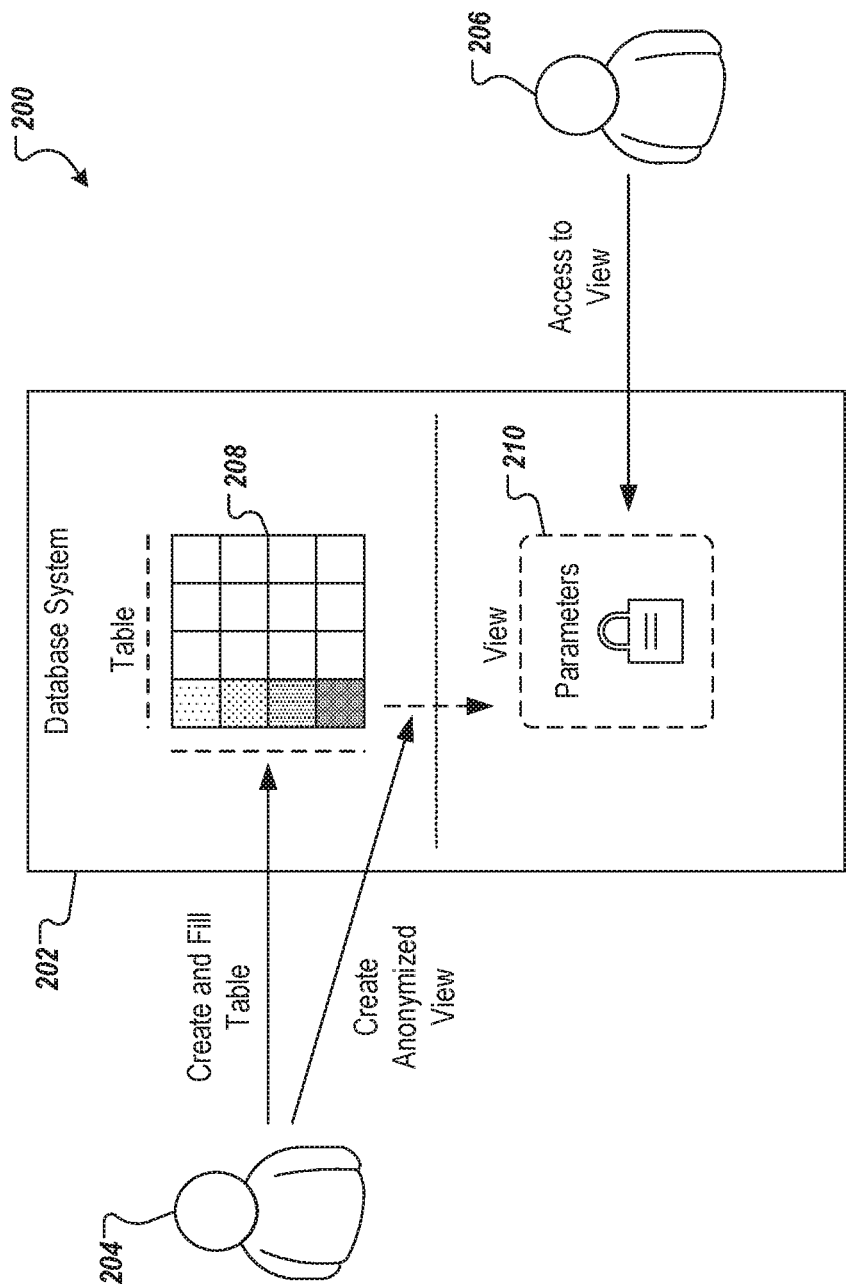
FIG. 2 depicts an example conceptual architecture in accordance with implementations of the present disclosure.

FIG. 2 depicts an example conceptual architecture 200 in accordance with implementations of the present disclosure. The example conceptual architecture 200 includes a database system 202 (e.g., an in-memory database system), a data controller 204, and an adversary 206. In the depicted example, the database system 202 maintains a table 208, within which data is stored, the data including sensitive data. The data stored within the table 208 is the responsibility of the data controller 204. The data controller 204 can represent any entity (e.g., person, university, hospital, financial services company, etc.) that holds sensitive data and is bound to maintain privacy of the sensitive data (e.g., by regulation, such as GDPR). For example, the data controller 204 collects (e.g., through one or more applications and/or systems operated by or on behalf of the data controller 204) and stores data within one or more tables within the database system 202, such as the table 208.

In accordance with implementations of the present disclosure, the data controller 304 creates one or more views within the database system 202, including a view 210. In some implementations, and as described in further detail herein, the data controller 204 provides a view using query commands that indicate a type of data anonymization that is to be used, as well as parameters for the type of data anonymization. As also described in further detail herein, the data controller 204 enables access to the view 210 by the adversary 206. In this manner, the adversary 206 is able to directly interact with data stored within the database system 202 through the view 210 without leakage of sensitive data and without having to export the data from the database system 202. Further, the view 210 enables any changes in underlying data to be accounted for and represented within the view 210 during analysis by the data controller 204.

Figure 3:
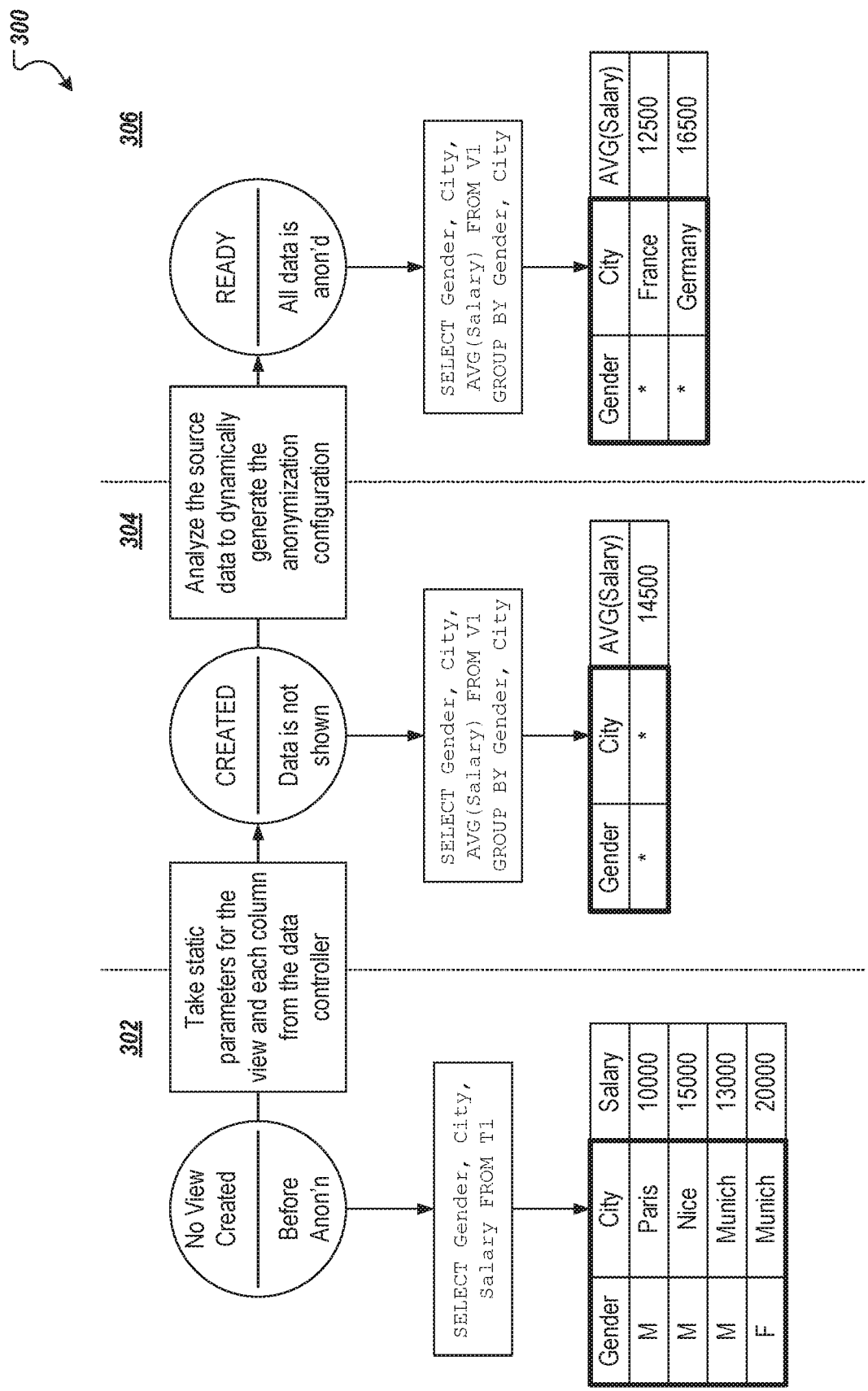
FIG. 3 depicts an example data anonymization flow in accordance with implementations of the present disclosure.

FIG. 3 depicts an example data anonymization flow 300 in accordance with implementations of the present disclosure. The example data anonymization flow 300 includes a plurality of phases: a declaration phase 302, an analysis phase 304, and an anonymization phase 306. In the declaration phase 302, a view is created, in the analysis phase 304 the data is analyzed, and in the anonymization phase 306, data is anonymized to provide anonymized data within the view.

In further detail, during the declaration phase 302, a data controller (e.g., the data controller 204 of FIG. 2) inputs static parameters for an anonymized view that is to be created. In some examples, the parameters can belong to the view, or each column of a table within which the data is stored. During the analysis phase 304, the data controller starts the data analysis and the anonymization algorithm dynamically generates the anonymization configuration by analyzing the data. Separate phases for declaration and analysis are provided for several reasons. For example, if the data changes and the change violates preconditions of the data anonymization, the analysis phase 304 would need to be repeated, and the analysis phase 304 can take a relatively long time to execute (e.g., particularly for k-Anonymity and l-Diversity).

For the declaration phase 302 and the analysis phase 304, implementations of the present disclosure introduce a query language syntax (SQL syntax). An example SQL syntax is provided as:

```
CREATE VIEW <VIEWNAME>[(<column_name_list>)] AS <subquery>
WITH ANONYMIZATION (ALGORITHM '<algorithm_name>'
[PARAMETERS '<static_parameters>']
COLUMN "<column_name>" PARAMETERS
'<column_specific_parameters>'
[{COLUMN "<column_name>" PARAMETERS
'<column_specific_parameters>'}]);
```

In accordance with implementations of the present disclosure, the view creation command (CREATE VIEW) takes an anonymization algorithm name and parameters as a string constant, as opposed to a keyword. In this manner, implementations of the present disclosure provide flexibility and extensibility in the type of anonymization that is to be used (e.g., enabling selection of the type of anonymization, and enabling other types of anonymization to be added to the database system. In some implementations, the view creation command takes anonymization parameters in multiple ways. For example, static parameters are bounded to the view. As another example, column-specific parameters are bounded to each column. In some implementations, the anonymization is executed by providing ways to parse the parameters, which are taken as string constants.

Implementations of the present disclosure further provide an example SQL syntax for altering the definition of a view by changing static parameters. An example SQL syntax is provided as:

```
ALTER VIEW <VIEWNAME> [(<column_name_list>)] AS <subquery>
WITH ANONYMIZATION (ALGORITHM '<algorithm_name>'
[PARAMETERS '<static_parameters>']
COLUMN "<column_name>" PARAMETERS
'<column_specific_parameters>'
[{COLUMN "<column_name>" PARAMETERS
'<column_specific_parameters>'}]);
```

With the alter view statement (ALTER VIEW), the data controller can change any static metadata except for ALGORITHM. In some implementations, the static metadata can only be changed before a first successful refresh, described in further detail herein. Accordingly, the alter view syntax is similar to the create view syntax.

In some implementations, after the analysis phase 304, the data controller grants access to the anonymized view for adversaries (e.g., data scientists) in the anonymization phase 306. During the anonymization phase 306, when adversary retrieves the anonymized data through the view, the anonymization (e.g., k-Anonymity, l-Diversity, Differential Privacy) anonymizes the source data using the configuration and returns the anonymized data in the query result. In some examples, and as described in further detail herein, adversaries can use a 'SELECT . . . FROM view' query to access the anonymized view.

As described above, implementations of the present disclosure provide static parameters and column-specific parameters. Example static parameters are provided in the following table:

| Key | Anon'n Type | Data Type | Constraints |
|---|---|---|---|
| k | k-Anonymity l-Diversity | Number | mandatory: $k > 1$ |
| l | l-Diversity | Number | mandatory: $0 < l < k$ |
| loss | k-Anonymity l-Diversity | Number | optional: default = 0, $0 \leq loss \leq 1$ |
| data_change_strategy | k-Anonymity l-Diversity Differential Privacy | String | optional: default = "qualified" valid values: "restricted" "static" "qualified" "qualified_best_effort" "suppress_new_or_changed_data" |

Example Static Parameters

In some examples, k defines the minimum group size parameter for k-Anonymity and l-Diversity, and floating-point numbers are rounded down. In some examples, l is the minimum number parameter of distinct sensitive values within each group for l-Diversity, and floating-point numbers are rounded down. In some examples, loss is the fraction of records that may be suppressed in the result for k-Anonymity and l-Diversity. In some examples, data_change_strategy defines how changes in the source data are handled during SELECT. For example: "restricted"—changes lead to an error, "static"—INSERTed data is suppressed, DELETEd data leads to an error, "qualified"—updates violating the conditions from static parameters lead to an error (no restrictions for Differential Privacy), "qualified . . . " (only for k-Anonymity and l-Diversity)—suppress data violating previous conditions, "suppress . . . " (only for Differential Privacy)—suppress updated data.

Example column-specific parameters are provided in the following table:

| Key | Anon'n Type | Data Type | Constraints |
|---|---|---|---|
| is_sequence | k-Anonymity l-Diversity Differential Privacy | Boolean | mandatory: Exactly one column with "is sequence": true must be present |
| epsilon | Differential Privacy | Number | mandatory: $epsilon > 0$ |
| sensitivity | Differential Privacy | Number | mandatory: $sensitivity > 0$ |

| Key | Anon'n Type | Data Type | Constraints |
|---|---|---|---|
| is_quasi_identifier | k-Anonymity l-Diversity | Boolean | mandatory: At least one column with "is_quasi_identifier": true must appear |
| hierarchy | k-Anonymity l-Diversity | Object of Strings | mandatory |
| suppression_symbol | k-Anonymity l-Diversity | String | optional: default * |
| weight | k-Anonymity l-Diversity | Number | optional: default = 1.0 weight ≥ 0 |
| min | k-Anonymity l-Diversity | Number | optional: default = 0 min ≥ 0 |
| max | k-Anonymity l-Diversity | Number | optional: default = highest level in the hierarchy max ≥ 0 |
| is_sensitive | l-Diversity Differential Privacy | Boolean | mandatory For l-Diversity multiple columns with "is_sensitive": true are supported, for Differential Privacy only one column is supported |

In some examples, is_sequence is used to mark a column containing unique integer values as the "sequence column," which is mandatory for anonymization views. In some examples, epsilon is related to the probability of individuals to contribute to a result, and is described in further detail herein. In some examples, sensitivity influences the magnitude of added noise, and is described in further detail herein. In some examples, is_quasi_identifier marks a column as a quasi-identifier. In some examples, suppression_symbol can be null or an arbitrary string. In some examples, for weight, the total of all weights must be greater than 0. In some examples, min limits the set of possible solutions by a minimum generalization level for the column. In some examples, max limits the set of possible solutions by a maximum generalization level for the column. In some examples, is_sensitive is used to mark a column as containing sensitive data. In some examples, hierarchy specifies a hierarchy definition for a view based on k-Anonymity and l-Diversity. In some examples, alternatives to hierarchy can be provided. Example alternatives include, without limitation, hierarchy.embedded, hierarchy.schema together with hierarchy.view, and hierarchy. schema together with hierarchy. function and hierarchy.levels.

Implementations of the present disclosure also provide system views to store metadata and display information about the data anonymization used in respective views. Example system views can include anonymization views (ANONYMIZATION_VIEWS) providing public information about a view, and anonymization view columns (ANONYMIZATION_VIEW_COLUMNS) providing public information about a column. An example anonymization views (ANONYMIZATION_VIEWS) is provided as:

| Column Name | Data Type | Description | Example Values |
|---|---|---|---|
| SCHEMA_NAME | NVARCHAR(256) | Schema name for anonymized view. | MY_ANON_SCHEMA |
| VIEW_NAME | NVARCHAR(256) | Object name for anonymized view. | MY_ANON_VIEW |
| ALGORITHM | VARCHAR(32) | Applied anonymization type. | 'K-ANONYMITY' |
| PARAMETERS | NCLOB | Bounded static parameters. | '{"data_change_strategy": "qualified", "k": 2}' |

Example ANONYMIZATION_VIEWS

An example anonymization view columns (ANONYMIZATION_VIEW_COLUMNS) is provided as:

| Column Name | Data Type | Description | Example Values |
|---|---|---|---|
| SCHEMA_NAME | NVARCHAR(256) | Schema name for anonymized view. | MY_ANON_SCHEMA |
| VIEW_NAME | NVARCHAR(256) | Object name for anonymized view. | MY_ANON_VIEW |
| COLUMN_NAME | NVARCHAR(256) | Column name. | GENDER |
| POSITION | INTEGER | Ordinal position of view column. | 1 |
| PARAMETERS | NCLOB | Bounded static parameters. | '{"hierarchy":{"embedded": [["F", "*"], ["M", "*"]]}}' |

Example ANONYMIZATION_VIEW_COLUMNS

Implementations of the present disclosure also provide modifications to existing system views. Example existing system views can include a general system view (SYS.VIEWS) and a features view (SYS.M_FEATURES). In some examples, the general system view can be modified to include a column specifying whether anonymization is applied. For example:

| Column Name | Data Type | Description | Example Values |
|---|---|---|---|
| HAS_ANONYMIZATION | VARCHAR(5) | Specifies whether column is anon'd. | 'TRUE' |

In some examples, the features view can be modified to add an item having a component name (COMPONENT_NAME) equal to data privacy (DATA PRIVACY) and a feature name (FEATURE_NAME) set to anonymization (ANONYMIZATION).

Implementations of the present disclosure further provide a monitoring view (M_ANONYMIZATION_VIEWS) that (dynamically) provides the current state of the anonymized view. For example:

| Column Name | Data Type | Description | Example Values |
|---|---|---|---|
| SCHEMA_NAME | NVARCHAR(256) | Schema name for anonymized view. | MY_ANON_SCHEMA |
| VIEW_NAME | NVARCHAR(256) | Object name for anonymized view. | MY_ANON_VIEW |
| ANONYMIZATION_STATUS | VARCHAR(16) | Status: CREATED, REFRESHING, READY, INVALID | 'READY' |
| REFERESH_RECOMMENDED | VARCHAR(5) | Indicates refresh should be performed. | 'TRUE' |
| LAST_REFRESH_TIME | TIMESTAMP | Latest time view refreshed. | Jan 14 2020 0:30 AM |
| LAST_REFRESH_PARAMETERS | NCLOB | Parameters taken from REFRESH VIEW command. | '{"some_json_key": "some_json_value"}' |

Implementations of the present disclosure are described in further detail herein with reference to example use cases. The example use cases include, without limitation, k-Anonymity, l-Diversity, and Differential Privacy. Example source data is provided for each of the example use cases of k-Anonymity and l-Diversity, which includes patient data. The following example patient data is used:

| Name | Gender | City | Age | Weight | Illness |
|---|---|---|---|---|---|
| Paul | M | Paris | 27 | 50 | Bronchitis |
| Martin | M | Munich | 42 | 100 | Angina |
| Nils | M | Nice | 50 | 130 | Flu |
| Annika | F | Munich | 11 | 38 | Broken Lag |
| ... | ... | ... | ... | ... | ... |

Example Patient Data

The example patient data includes identifiers (Name), quasi-identifiers (Gender, City, Age, Weight), and sensitive data (Illness). For example, an identifier directly identifies an individual (e.g., name, social security number), a quasi-identifier might not uniquely identify an individual, but a set of quasi-identifiers could, and sensitive data is something that an individual does not want known about them.

With reference to k-Anonymity, k-Anonymity anonymizes data, such that the data for each person should not be distinguished from at least K−1 individuals. This is achieved by suppressing and generalizing values in quasi-identifying information. In some examples, suppression includes replacing certain values with a masking character (e.g., an asterisk "*"). In some examples, generalization includes replacing individual values of attributes to with a broader category (e.g., 'Paris' of the attribute 'City' to 'France' or 'Europe'). In some examples, k-Anonymity can be applied to data that contains categorical values. Although k-Anonymity does not provide a statistical guarantee, it is a widely used type of anonymization due to its simplicity and intuitiveness.

In accordance with implementations of the present disclosure, the data controller creates a table within a database system and fills the table with source data. The following example SQL statement is provided:

```
CREATE TABLE ILLNESS (
-- Sequential Column
ID BIGINT not null primary key generated always as IDENTITY,
-- Identifiers
NAME VARCHAR(10),
-- Quasi Identifiers (QIDs) (would be generalized by k-Anonymity)
GENDER VARCHAR(1) not null,
CITY VARCHAR(10) not null,
```

```
AGE INTEGER not null,
WEIGHT DECIMAL not null,
-- Sensitive Data
ILLNESS VARCHAR(10) not null);
INSERT INTO ILLNESS VALUES ('Paul', 'M', 'Paris', 27, 50.0,
'BRONCHITIS');
INSERT INTO ILLNESS VALUES ('Martin', 'M', 'Munich', 42, 100.0,
'ANGINA');
INSERT INTO ILLNESS VALUES ('Nils', 'M', 'Nice', 50, 130, 'FLU');
INSERT INTO ILLNESS VALUES ('Annika', 'F', 'Munich', 11, 38.0,
'BROKEN LEG');
```

Further, a hierarchy is defined that can be used for generalizing attributes to broader categories. The hierarchy can include various levels, in which the lowest level provides the specific attribute (e.g., City), and the highest level provides a masking character (e.g., *). In some examples, levels between the lowest level and the highest level provide generalization of the attribute (e.g., Country, Continent). The following example SQL statement is provided:

```
CREATE COLUMN TABLE CITYDATASOURCE (SUCC
VARCHAR(100), PRED VARCHAR(100));
--// Level 2
INSERT INTO CITYDATASOURCE VALUES ('Asia', NULL);
--// Level 1
INSERT INTO CITYDATASOURCE VALUES ('France', 'Europe');
INSERT INTO CITYDATASOURCE VALUES ('S. Korea', 'Asia');
--// Level 0
INSERT INTO CITYDATASOURCE VALUES ('Munich', 'Germany');
INSERT INTO CITYDATASOURCE VALUES ('Nice', 'France');
INSERT INTO CITYDATASOURCE VALUES ('Paris', 'France');
INSERT INTO CITYDATASOURCE VALUES ('Seoul', 'S. Korea');
INSERT INTO CITYDATASOURCE VALUES ('Busan', 'S. Korea');
--A NULL value in the parent/predecessor column refers to the
topmost element (root) and equals * in
embedded hierarchies. Note that only level 0 values come from the
original table.
```

In some implementations, a hierarchy view can be created on top of the data source table to enable higher-level generalizations to be applied. The following example SQL statement is provided:

```
CREATE VIEW CITYHIERARCHY AS SELECT * FROM HIERARCHY
(SOURCE(SELECT SUCC AS NODE_ID, PRED AS PARENT_ID
FROM CITYDATASOURCE) SIBLING ORDER BY PARENT_ID,
NODE_ID);
```

Further, a hierarchy function is provided for replacing values during anonymization. The following example SQL syntax is provided:

```
CREATE OR REPLACE FUNCTION hierarchyfunction(value
VARCHAR(255), level INTEGER)
   RETURNS outValue VARCHAR(8)
   AS
     weight DECIMAL(3,2);
   BEGIN
   weight := TO_DECIMAL(value, 3,2);
   IF (level = 1) then
     IF (weight < 50) THEN
       outValue := '< 50';
     END IF;
     IF (weight >=50 AND weight < 100) THEN
       outValue = '50 - 100';
     END IF;
     IF (weight >=100 and weight < 150) THEN
       outValue := '100 -150';
```

```
     END IF;
     IF (weight >=150) THEN
       outValue := '>=150';
     END IF;
   END IF;
   IF (level = 2) THEN
     IF (weight < 100) THEN
       outValue := '< 100';
     END IF;
     IF (weight >= 100) THEN
       outValue := '>= 100';
     END IF;
   END IF;
   END;
```

The above-example hierarchy function is associated with the weight attribute. It is contemplated, however, that one or more additional hierarchy functions can be provided (e.g., for the age attribute).

In accordance with implementations of the present disclosure, an anonymized view (e.g., ILLNESS_K_ANON) is defined by the data controller using the query language syntax introduced herein. The following example SQL statement is provided:

```
CREATE VIEW ILLNESS_K_ANON (ID, GENDER, LOCATION, AGE,
WEIGHT, ILLNESS)
AS SELECT ID, GENDER, CITY AS LOCATION, TO VARCHAR(AGE)
AS AGE, TO_VARCHAR(WEIGHT) AS WEIGHT, ILLNESS
FROM ILLNESS
WITH ANONYMIZATION (ALGORITHM 'K-ANONYMITY'
PARAMETERS '{"data_change_strategy": "qualified", "k": 2}'
COLUMN ID PARAMETERS '{"is_sequence": true}'
COLUMN GENDER PARAMETERS '{"is_quasi_identifier":true,
"hierarchy": {"embedded": [["F"], ["M"]]}}' --
Json Hierarchy example
COLUMN LOCATION PARAMETERS '{"is_quasi_identifier":true,
"hierarchy":{"schema":"SYSTEM",
"view":"CITYHIERARCHY"}}' -- External Hierarchy example
COLUMN AGE PARAMETERS '{"is_quasi_identifier":true,
"hierarchy":{"embedded": [["27", "15"], ["42",
"45"], ["50", "45"], ["11", "15"]]}}' -- 0~30 -> 15 -> *, 30-60 ->
45 -> *
COLUMN WEIGHT PARAMETERS '{"is_quasi_identifier":true,
"hierarchy":{"schema":"SYSTEM",
"function":"HIERARCHYFUNCTION", "levels": 4}}'); -- Function
Hierarchy example
```

Further, an anonymization configuration is generated by the data controller using the query language syntax introduced herein. The following example SQL statement is provided:

REFRESH VIEW ILLNESS_K_ANON ANONYMIZATION;

With each of the hierarchy, hierarchy function, view, and anonymization configuration defined, the data controller can make the view available to one or more adversaries (e.g., data scientists). For example, an adversary can access the database system to retrieve the anonymized data (and non-anonymized data) using the view. The following example SQL statement is provided:

SELECT * FROM ILLNESS_K_ANON;

That is, the adversary can submit the above-example query to the database system, which processes the query to provide a query result. An example query result based on the example patient data can be provided as:

| ID | Gender | Location | Age | Weight | Illness |
|----|--------|----------|-----|--------|---------|
| 1 | * | Europe | 15 | <100 | Bronchitis |
| 2 | * | Europe | 45 | >=100 | Angina |
| 3 | * | Europe | 45 | >=100 | Flu |
| 4 | * | Europe | 15 | <100 | Broken Leg |

| ID | Gender | Location | Age | Weight | Illness |
|----|--------|----------|-----|--------|---------|
| 1 | * | Europe | * | * | Bronchitis |
| 2 | * | Europe | * | * | Angina |
| 3 | * | Europe | * | * | Flu |
| 4 | * | Europe | * | * | Broken Leg |

With reference to l-Diversity, l-Diversity can be described as an extension of k-Anonymity. In general, l-Diversity provides group-based anonymization that preserves privacy in data sets by reducing the granularity of a data representation. l-Diversity adds the promotion of intra-group diversity for sensitive data in the anonymization. For l-Diversity in accordance with implementations of the present disclosure, the data controller creates a table within a database system and fills the table with source data, and defines the hierarchy and hierarchy function(s) as described above with reference to k-Anonymity.

In accordance with implementations of the present disclosure, an anonymized view (e.g., ILLNESS_L_DIV) is defined by the data controller using the query language syntax introduced herein. The following example SQL statement is provided:

```
CREATE VIEW ILLNESS_L_DIV (ID, GENDER, LOCATION, AGE,
WEIGHT, ILLNESS)
AS SELECT ID, GENDER, CITY AS LOCATION, TO_VARCHAR
(AGE)
AS AGE, TO_VARCHAR(WEIGHT) AS WEIGHT, ILLNESS
FROM ILLNESS
WITH ANONYMIZATION (ALGORITHM 'L-DIVERSITY'
PARAMETERS '{"data_change_strategy": "qualified", "k": 3, "l":
3}'
COLUMN ID PARAMETERS '{"is_sequence": true}'
COLUMN GENDER PARAMETERS '{"is_quasi_identifier":true,
"hierarchy": {"embedded": [["F"], ["M"]]}}' --
Json Hierarchy example
COLUMN LOCATION PARAMETERS '{"is_quasi_identifier":true,
"hierarchy":{"schema":"SYSTEM",
"view":"CITYHIERARCHY"}}' -- External Hierarchy example
COLUMN AGE PARAMETERS '{"is_quasi_identifier":true,
"hierarchy":{"embedded": [["27", "15"], ["42",
"45"], ["50", "45"], ["11", "15"]]}}' -- 0-30 -> 15 -> *, 30~60 ->
45 -> *
COLUMN WEIGHT PARAMETERS '{"is_quasi_identifier":true,
"hierarchy":{"schema":"SYSTEM",
"function":"HIERARCHYFUNCTION", "levels": 4}}' -- Function
Hierarchy example
COLUMN ILLNESS PARAMETERS '{"is_sensitive":true}');
```

Further, an anonymization configuration is generated by the data controller using the query language syntax introduced herein. The following example SQL statement is provided:
REFRESH VIEW ILLNESS_L_DIV ANONYMIZATION;

With each of the hierarchy, hierarchy function, view, and anonymization configuration defined, the data controller can make the view available to one or more adversaries (e.g., data scientists). For example, an adversary can access the database system to retrieve the anonymized data (and non-anonymized data) using the view. The following example SQL statement is provided:
SELECT * FROM ILLNESS_L_DIV;

That is, the adversary can submit the above-example query to the database system, which processes the query to provide a query result. An example query result based on the example patient data can be provided as:

With reference to Differential Privacy, Differential Privacy can be described as a statistical technique to provide means to maximize the accuracy of queries from database systems, while minimizing the privacy impact on sensitive data stored in the database system. Differential Privacy randomizes sensitive data by adding a noise to each sensitive value. However, the outcome of statistical queries remains approximately the same, regardless of whether an individual record is included in the data set. In some examples, noise can be drawn from a distribution (e.g., Laplace distribution) to addition to sensitive data.

In further detail, an identifier (ID) of a column that contains sensitive data is provided, and the anonymization adds noise to the data value in the column. In some examples, multiple columns can be identified. In some examples, for each identified column, a sensitivity value is provided, which represents the sensitivity of data (e.g., the maximum impact of an individual record). In some examples, the sensitivity can depend on the highest and lowest value in the to-be-noised column (e.g., the higher the sensitivity, the more noise is applied). In some examples, a value epsilon ($\epsilon$) is provided as a positive real number (e.g., 0.1, 0.01). In some examples, $\epsilon$ influences the amount of noise that is applied. For example, the lower the value of $\epsilon$, the more noise is applied.

Example source data is provided for each of the example use case of Differential Privacy, which includes salary data. The following example salary data is used:

| Name | Gender | Zip | Education | Salary | Bonus |
|------|--------|-----|-----------|--------|-------|
| Paul | F | 12345 | Bachelor | 40000 | 1000.0 |
| Martin | M | 12345 | Master | 45000 | 2000.0 |
| Nils | M | 12345 | Bachelor | 43000 | 1700.0 |
| Annika | F | 12345 | PhD | 50000 | 4000.0 |
| ... | ... | ... | ... | ... | ... |

Example Salary Data

In accordance with implementations of the present disclosure, the data controller creates a table within a database system and fills the table with source data. The following example SQL statement is provided:

```
CREATE TABLE SALARY (
-- Sequential Column
ID BIGINT not null primary key generated always as IDENTITY,
-- Identifiers and QIDs
NAME VARCHAR(10),
GENDER VARCHAR(1),
ZIP VARCHAR(5),
EDUCATION VARCHAR (10),
-- Sensitive Data (can be randomized by Differential Privacy)
SALARY DOUBLE not null,
BONUS DOUBLE not null);
INSERT INTO SALARY VALUES ('Paul', 'F', '12345', 'BACHELOR',
40000, 1000.0);
INSERT INTO SALARY VALUES ('Martin', 'M', '12345', 'MASTER',
45000, 2000.0);
INSERT INTO SALARY VALUES ('Nils', 'M', '12345', 'BACHELOR',
```

```
43000, 1700.0);
INSERT INTO SALARY VALUES ('Annika', 'F', '12345', 'PHD',
50000,
4000.0);
```

In accordance with implementations of the present disclosure, an anonymized view (e.g., SALARY_DIFF_PRIV) is defined by the data controller using the query language syntax introduced herein. The following example SQL statement is provided:

```
CREATE VIEW SALARY_DIFF_PRIV (ID, GENDER, ZIP,
EDUCATION, SALARY, BONUS)
AS SELECT ID, GENDER, ZIP, EDUCATION, SALARY, BONUS
FROM SALARY -
- Note that the identifier (NAME) is not selected
WITH ANONYMIZATION (ALGORITHM 'DIFFERENTIAL_PRIVACY'
PARAMETERS '{"data_change_strategy": "qualified"}'
COLUMN ID PARAMETERS '{"is_sequence": true}'
COLUMN SALARY PARAMETERS '{"is_sensitive":true, "epsilon":0.1,
"sensitivity":50000}');
```

Further, an anonymization configuration is generated by the data controller using the query language syntax introduced herein. The following example SQL statement is provided:
REFRESH VIEW SALARY_DIFF_PRIV ANONYMIZATION;

With each of the view and anonymization configuration defined, the data controller can make the view available to one or more adversaries (e.g., data scientists). For example, an adversary can access the database system to retrieve the anonymized data (and non-anonymized data) using the view. The following example SQL statement is provided:
SELECT * FROM SALARY_DIFF_PRIV;
That is, the adversary can submit the above-example query to the database system, which processes the query to provide a query result. An example query result based on the example patient data can be provided as:

| ID | Gender | Zip | Education | Salary | Bonus |
|----|--------|-------|-----------|-------------|-------|
| 1  | F      | 12345 | Bachelor  | 287586.439  | 1,000 |
| 2  | M      | 12345 | Master    | 249323.981  | 2,000 |
| 3  | M      | 12345 | Bachelor  | 15713.706   | 1,700 |
| 4  | F      | 12345 | PhD       | −781847.44  | 4,000 |

It can be noted that a different anonymized view for the same data may show different values for the sensitive data. This is because Differential Privacy adds random noise to the sensitive values to protect privacy, while maximizing the accuracy of queries. In some examples, however, the same view always returns same value by storing a random seed in metadata.

Figure 4:
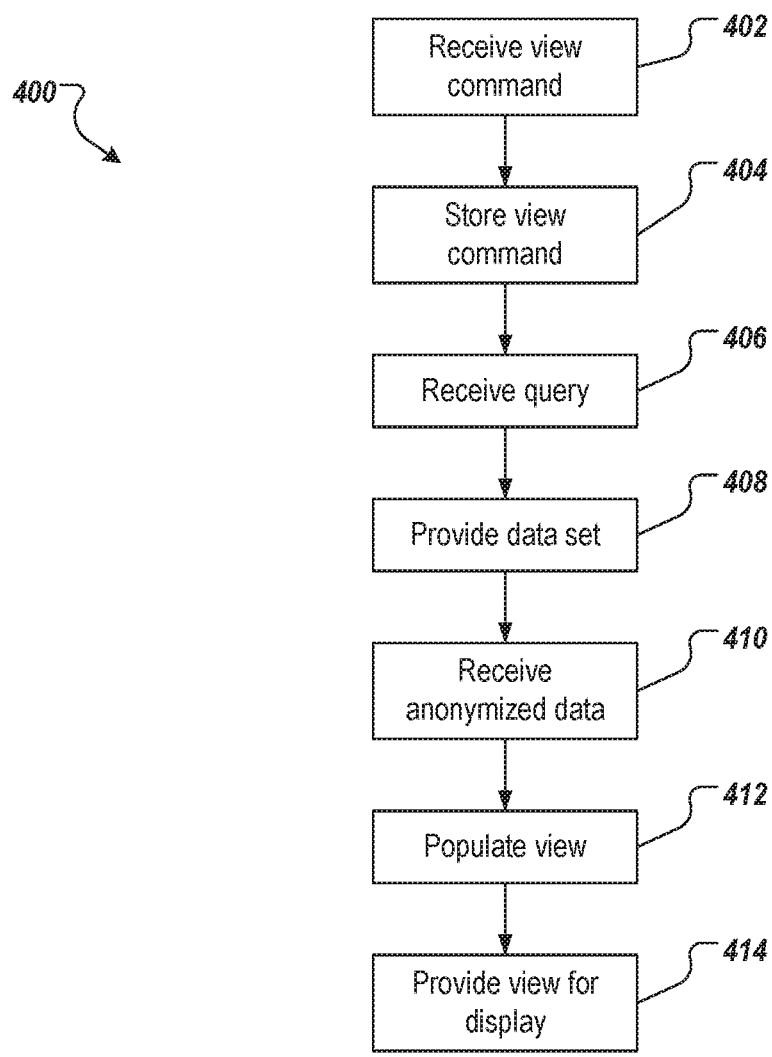
FIG. 4 depicts an example process that can be executed in accordance with implementations of the present disclosure.

FIG. 4 depicts an example process 400 that can be executed in accordance with implementations of the present disclosure. In some implementations, the example process 400 may be performed using one or more computer-executable programs executed using one or more computing devices. The example process 400 can be performed for providing access to anonymized data within a database system using one or more anonymized views.

A view command is received (402). For example, a data controller (e.g., the data controller 204 of FIG. 2) submits a view command to a database system (e.g., the database system 202 of FIG. 2). In accordance with the query language syntax of the present disclosure, the view command can be executed for creating a view to display anonymized data in response to one or more queries to the database system. In some implementations, the view command includes a view name (e.g., ILLNESS_K_ANON), a table (e.g., ILLNESS), a set of columns of the table (e.g., ID, GENDER, LOCATION, AGE, WEIGHT, ILLNESS), an anonymization type (e.g., ALGORITHM 'K-ANONYMITY'), a set of static parameters (e.g., PARAMETERS '{"data_change_strategy":"qualified", "k":2}'), and, for a sub-set of columns of the table (e.g., ID, GENDER, LOCATION, AGE, WEIGHT), one or more sets of column-specific parameters, each set of column-specific parameters being specific to anonymization of data of a respective column of the table included in the sub-set of columns (e.g., ID PARAMETERS ' {"is_sequence":true}'; GENDER PARAMETERS '{"is_quasi_identifier":true, "hierarchy": {"embedded": [["F"], ["M"]]}}'; LOCATION PARAMETERS '{"is_quasi_identifier":true, "hierarchy": {"schema":"SYSTEM", "view":"CITYHIERARCHY"}}'; AGE PARAMETERS '{"is_quasi_identifier":true, "hierarchy":{"embedded":[["27", "15"], ["42", "45"], ["50", "45"], ["11", "15"]]}}'; WEIGHT PARAMETERS '{"is_quasi_identifier":true, "hierarchy":{"schema":"SYSTEM", "function":"HIERARCHYFUNCTION", "levels": 4}}').

The view command is stored (404). For example, the view command can be stored within the database system and made available for selection by one or more adversaries that seek to query the database system. In some examples, a list of views is displayed to an adversary to enable the adversary to formulate queries using one or more views in the list of views.

A query is received (406). For example, an adversary submits a query (e.g., SELECT * FROM ILLNESS_K_ANON;) to the database system, the query including the view name (e.g., ILLNESS_K_ANON;). A data set is provided (408). For example, in response to the query, data from each of the columns identified in the view is retrieved from one or more tables (e.g., ILLNESS). Anonymized data is received (410). For example, data that is provided from columns of a table that are to be anonymized is provided to an anonymization engine along with anonymization parameters and respective column-specific parameters. In some examples, the anonymization engine corresponds to the type of anonymization specified in the view command, and processes the data to provide anonymized data as output. A view is populated (412). For example, the view is populated to include the anonymized data provided from the anonymization engine. In some examples, the view is also populated with data from the table that has not been anonymized (e.g., Bronchitis, Angina, Flu, Broken Leg). The view is provided for display (414). For example, the view can be provided as a virtual table that is displayed to the user that submitted the query (e.g., on a computing device used by the user).

Figure 5:
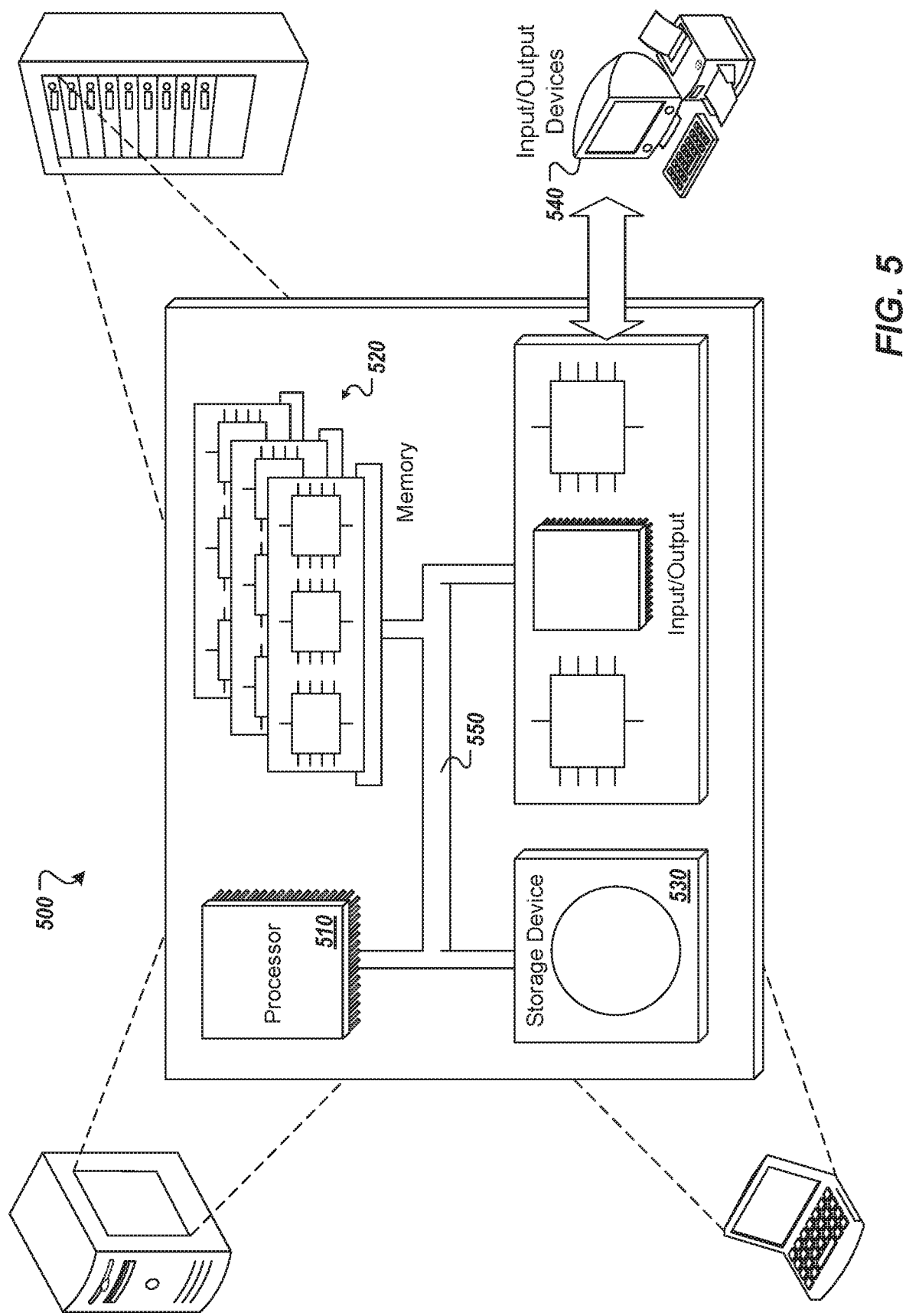
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for providing access to data in a database system that stores sensitive data, the method comprising:
   receiving, by a database system, a create view command for creating a view to display anonymized data in response to one or more queries to the database system, the create view command comprising a view name, a table, a set of columns of the table, an anonymization type, a set of static parameters based on the anonymization type, and, for a sub-set of columns of the table, one or more sets of column-specific parameters, each set of column-specific parameters being specific to anonymization of data of a respective column of the table included in the sub-set of columns, the anonymization type being unalterable, and static parameters in the set of static parameters being alterable only before a successful refresh;
   storing, by the database system, the create view command within the database system; and
   receiving, by the database system, a query comprising a select command from the view, and in response:
      providing a data set comprising data from each column in the sub-set of columns,
      receiving an anonymized data set comprising anonymized data that is generated from the data set using the anonymization type, the static parameters, and the sets of column-specific parameters, and
      providing the view as a virtual table that is at least partially populated with the anonymized data set in respective columns for display to a user that submitted the query.

2. The method of claim 1, wherein the virtual table is at least partially populated with non-anonymized data from at least one column of the table, the at least one column being absent from the sub-set of columns of the table.

3. The method of claim 1, wherein at least one set of column-specific parameters defines a hierarchy for generalizing data of a respective column during anonymization.

4. The method of claim 1, wherein at least one set of column-specific parameters defines a suppression symbol for replacing a data value for anonymization.

5. The method of claim 1, wherein the anonymization type comprises one of k-Anonymity and l-Diversity and the static parameters comprise a minimum group size and a loss.

6. The method of claim 1, wherein the anonymization type comprises one of k-Anonymity, l-Diversity, and Differential Privacy, and the static parameters define a data change strategy.

7. The method of claim 1, wherein the anonymization type comprises one of k-Anonymity, l-Diversity, and Differential Privacy, and the sets of column-specific parameters identify a column of the sub-set of columns as a sequence column.

8. A non-transitory computer-readable storage medium coupled to one or more processors and having instructions stored thereon which, when executed by the one or more processors, cause the one or more processors to perform operations for providing access to data in a database system that stores sensitive data, the operations comprising:
   receiving, by a database system, a create view command for creating a view to display anonymized data in response to one or more queries to the database system, the create view command comprising a view name, a table, a set of columns of the table, an anonymization type, a set of static parameters based on the anonymization type, and, for a sub-set of columns of the table, one or more sets of column-specific parameters, each set of column-specific parameters being specific to anonymization of data of a respective column of the table included in the sub-set of columns, the anonymization type being unalterable, and static parameters in the set of static parameters being alterable only before a successful refresh;
   storing, by the database system, the create view command within the database system; and
   receiving, by the database system, a query comprising a select command from the view, and in response:
      providing a data set comprising data from each column in the sub-set of columns,
      receiving an anonymized data set comprising anonymized data that is generated from the data set using the anonymization type, the static parameters, and the sets of column-specific parameters, and providing the view as a virtual table that is at least partially populated with the anonymized data set in respective columns for display to a user that submitted the query.

9. The computer-readable storage medium of claim 8, wherein the virtual table is at least partially populated with non-anonymized data from at least one column of the table, the at least one column being absent from the sub-set of columns of the table.

10. The computer-readable storage medium of claim 8, wherein at least one set of column-specific parameters defines a hierarchy for generalizing data of a respective column during anonymization.

11. The computer-readable storage medium of claim 8, wherein at least one set of column-specific parameters defines a suppression symbol for replacing a data value for anonymization.

12. The computer-readable storage medium of claim 8, wherein the anonymization type comprises one of k-Anonymity and l-Diversity and the static parameters comprise a minimum group size and a loss.

13. The computer-readable storage medium of claim 8, wherein the anonymization type comprises one of k-Anonymity, l-Diversity, and Differential Privacy, and the static parameters define a data change strategy.

14. The computer-readable storage medium of claim 8, wherein the anonymization type comprises one of k-Anonymity, l-Diversity, and Differential Privacy, and the sets of column-specific parameters identify a column of the sub-set of columns as a sequence column.

15. A system, comprising:
one or more computers; and
a computer-readable storage device coupled to the computing device and having instructions stored thereon which, when executed by the computing device, cause the computing device to perform operations for providing access to data in a database system that stores sensitive data, the operations comprising:
receiving, by a database system, a create view command for creating a view to display anonymized data in response to one or more queries to the database system, the create view command comprising a view name, a table, a set of columns of the table, an anonymization type, a set of static parameters based on the anonymization type, and, for a sub-set of columns of the table, one or more sets of column-specific parameters, each set of column-specific parameters being specific to anonymization of data of a respective column of the table included in the sub-set of columns, the anonymization type being unalterable, and static parameters in the set of static parameters being alterable only before a successful refresh;
storing, by the database system, the create view command within the database system; and
receiving, by the database system, a query comprising a select command from the view, and in response:
providing a data set comprising data from each column in the sub-set of columns,
receiving an anonymized data set comprising anonymized data that is generated from the data set using the anonymization type, the static parameters, and the sets of column-specific parameters, and
providing the view as a virtual table that is at least partially populated with the anonymized data set in respective columns for display to a user that submitted the query.

16. The system of claim 15, wherein the virtual table is at least partially populated with non-anonymized data from at least one column of the table, the at least one column being absent from the sub-set of columns of the table.

17. The system of claim 15, wherein at least one set of column-specific parameters defines a hierarchy for generalizing data of a respective column during anonymization.

18. The system of claim 15, wherein at least one set of column-specific parameters defines a suppression symbol for replacing a data value for anonymization.

19. The system of claim 15, wherein the anonymization type comprises one of k-Anonymity and l-Diversity and the static parameters comprise a minimum group size and a loss.

20. The system of claim 15, wherein the anonymization type comprises one of k-Anonymity, l-Diversity, and Differential Privacy, and the static parameters define a data change strategy.

* * * * *